United States Patent
Florey et al.

(10) Patent No.: US 10,630,732 B2
(45) Date of Patent: *Apr. 21, 2020

(54) EMERGENCY CLAIM RESPONSE UNIT

(71) Applicant: Florey Insurance Agency, Inc., Clarks Summit, PA (US)

(72) Inventors: Thomas E. Florey, South Abington Township, PA (US); Hector A. De La Cruz, Exeter, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/446,621

(22) Filed: Jun. 20, 2019

(65) Prior Publication Data

US 2019/0306205 A1    Oct. 3, 2019

Related U.S. Application Data

(63) Continuation-in-part of application No. 15/872,369, filed on Jan. 16, 2018, now Pat. No. 10,470,023, and a continuation-in-part of application No. 15/806,727, filed on Nov. 8, 2017, now Pat. No. 10,382,497.

(51) Int. Cl.
    *H04L 29/06* (2006.01)
    *G06Q 10/10* (2012.01)
    *H04M 11/04* (2006.01)

(52) U.S. Cl.
    CPC ......... *H04L 65/1069* (2013.01); *G06Q 10/10* (2013.01); *H04L 65/1059* (2013.01); *H04L 65/608* (2013.01)

(58) Field of Classification Search
    USPC .......................................................... 379/37
    See application file for complete search history.

(56) References Cited

U.S. PATENT DOCUMENTS

| | | | |
|---|---|---|---|
| 9,691,189 B1 | 6/2017 | Creath | |
| 2003/0012344 A1* | 1/2003 | Agarwal | H04M 11/04 379/37 |

(Continued)

OTHER PUBLICATIONS

Non-Final Office Action dated Apr. 8, 2019 in parent U.S. Appl. No. 15/872,369, filed Jan. 16, 2018.

(Continued)

*Primary Examiner* — Maria El-Zoobi
(74) *Attorney, Agent, or Firm* — Zale Patent Law, Inc.; James R. McDaniel; Lawrence P. Zale

(57) ABSTRACT

A system 1000 enables an Emergency Claim Response Person (ERCP) 13 to remotely take control of an emergency situation via a live video link by directing an insured at the accident scene to take certain actions and acquire information and videos required for filing an insurance claim. The system 1000 includes an insured 1 using a smartphone 200 loaded with a proprietary App 211 that connects with the ECRP 13 at an emergency claim response unit (ECRU) 300 through a compatible video hosting server. The ECRP calms the insured 1 and instructs the insured 1 through the post-accident process. The ECRU 300 finds and requests the appropriate ambulance company, police and fire departments, when necessary. The ECRP 13 directs the insured 1 to video the accident scene, vehicle positions/orientation, and damage. The ECRU 300/ECRP 13 also instruct the insured to provide the insured's smartphone 200 to others to acquire video statements.

20 Claims, 10 Drawing Sheets

(56) References Cited

U.S. PATENT DOCUMENTS

| | | | |
|---|---|---|---|
| 2009/0186596 A1* | 7/2009 | Kaltsukis | G08B 25/08 |
| | | | 455/404.2 |
| 2012/0092439 A1 | 4/2012 | Mackie et al. | |
| 2014/0173701 A1 | 6/2014 | Albouyeh et al. | |
| 2014/0278585 A1* | 9/2014 | Zerbib | G06Q 40/08 |
| | | | 705/4 |
| 2016/0048932 A1 | 2/2016 | McNelley | |
| 2016/0127536 A1 | 5/2016 | Jayapalan et al. | |
| 2017/0149707 A1 | 5/2017 | Hatter et al. | |
| 2018/0082379 A1* | 3/2018 | Kelsh | G06Q 50/22 |
| 2018/0091930 A1* | 3/2018 | Jefferies | H04L 63/08 |

OTHER PUBLICATIONS

Jun. 14, 2018 1st Office Action for one parent case U.S. Appl. No. 15/806,727, filed Nov. 8, 2017.

"How Live Video is underwriting Insurtech Growth" by by Charles Rummelein, Sep. 29, 2017. https://tokbox.com/blog/live-video-underwriting-insurtech-growth/.

Nov. 16, 2018 2nd Office Action for one parent case U.S. Appl. No. 15/806,727, filed Nov. 8, 2017.

Apr. 17, 2019 Notice of Allowance for one parent case U.S. Appl. No. 15/806,727, filed Nov. 8, 2017.

Apr. 8, 2019 Office Action for another parent case U.S. Appl. No. 15/872,369, filed Jan. 16, 2018.

* cited by examiner

EMERGENCY CLAIM RESPONSE UNIT

CROSS REFERENCE TO RELATED APPLICATIONS

This application is continuation-in-part of U.S. patent application Ser. No. 15/872,369, filed on Jan. 16, 2018 by T. Florey and H. De La Cruz entitled "Emergency Claim Response Unit" and U.S. patent application Ser. No. 15/806,727 filed on Nov. 8, 2017 by T. Florey and H. De La Cruz entitled "Instant Agent" which are both hereby incorporated by reference as if set forth in its entirety herein to the extent that they does not conflict with this application.

FIELD

The current invention relates to a system that, in the event of an accident, or other insured event, notifies first responders, allows a remote emergency claim response unit (ECRU) to provide directions to an insured to acquire information and videos for an insurance claim; and more specifically to a system that, in the event of an accident, or other insured event, immediately notifies first responders, allows the ECRU to provide directions to the insured via video link on what to do, and acquires information and videos for an insurance claim and links live to a legal person.

BACKGROUND

After an auto accident or other insurable event, such as a house fire, dog bite, slip and fall injury, etc. (collectively referred to as an "Accident"), those involved are typically nervous and disoriented. Sometimes those involved are injured and need emergency care.

The average person does not typically get in many Accidents, and if they were, it was probably a long time ago. They tend to forget how to request first responders, such as ambulance, police, fireman, what the procedure for reporting an Accident is, and what information is required. These may be referred to as a post-accident procedure.

The most urgent need after an Accident is to take care of the injured.

It is also important to find out who witnessed the accident, since these people leave the scene quickly.

There are also those in the cars involved in the tragedy, such as passengers in a vehicle involved in an accident. They may be referred to as 'accident participants.'

Many times, vehicles involved in the accident may be blocking traffic or otherwise must be moved. After they are moved, it alters the scene of the Accident.

Similarly, the accident scene can be changed shortly after other Accidents, such as a house fire.

At some later time, it may be important to have accurate information of the accident scene to determine fault, liability, and reimbursement from an insurance company.

After the emergency actions have been implemented, other post-accident procedure steps are performed, such as acquiring information and video feed for the insurance claims process.

The insurance claims process is the process of notifying the insurance company of damage and expenses that occurred, which are then verified by an Adjuster of the insurance company (the "Carrier"). An insurance claim is filed for reimbursement for medical expenses, and/or damage due to Accidents. The insurance claim is later processed, and the insured is paid by the Carrier. Sometimes, there are legal aspects of claim processing which may require a legal person to request information and provide instruction, direction or advice.

Many of those insured who have made an insurance claim complain that the time it takes to process a claim and receive payment is too long and can be shortened.

Also, there sometimes is a lack of evidence to prove allegations of the insured.

It takes time for an Adjuster at the insurance company to collect the relevant information, determine the amount of damages.

Typically, the amount of damage is determined by an insurance adjuster and/or appraiser (collectively referred to as the 'Adjuster'). The Adjuster rarely can be at an Accident scene before it is changed or even cleared. The Adjuster may also drive to a location where the damaged car is stored, such as a body shop, and determine the amount of damage, or to a house which has recently burned down, or to visit a patient in the hospital after an injury, etc.

The Adjuster may also visit the accident site later to acquire information or assess the damage at the site.

After an Accident, the injured are quickly transported to a hospital. In auto accidents, vehicles, if not drivable, are also quickly towed away to open the road to traffic again. In most Accidents, the witnesses typically leave, many times without providing their identity or providing a statement.

Therefore, much of the information is provided by a police report written by a policeman who has no personal knowledge of the Accident, and can only speculate on how it happened. The site is typically changed by the time the policeman reaches it.

The policeman also acquires information through the people on the scene after they have had some time to think about the Accident and possibly call and talk with others about it.

As time goes on, the insured may receive suggestions to alter the facts to put him/her in a better position.

Also, since an Accident is typically a traumatic event, the insured is nervous, upset, emotional and has trouble communicating and providing accurate descriptions. They tend to provide descriptions which are inaccurate, with little description and tend to leave out relevant facts.

Those who have seen the Accident but were not participants in the Accident ("witnesses") are usually non-biased, not as emotional and a better source of information. However, they may leave before the police arrive to interview them.

The police write a report which typically is missing information and is written through the perception of the policeman. This may further color the report.

The Adjuster later must fill in missing information. The Adjuster may not have any information on the witnesses, is missing statements from those in the accident and supplements this with information acquired later from those who were involved with the accident. Even several days later, memories, fade, those involved tend to listen to friends and color the facts.

Currently, there is a need to calm those involved in the accident, quickly request first responders, and more quickly and accurately acquire information/evidence required for an insurance claim and/or any legal allegations.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale; emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted to facilitate a less obstructed view of these various example embodiments.

DETAILED DESCRIPTION

Figure 1:
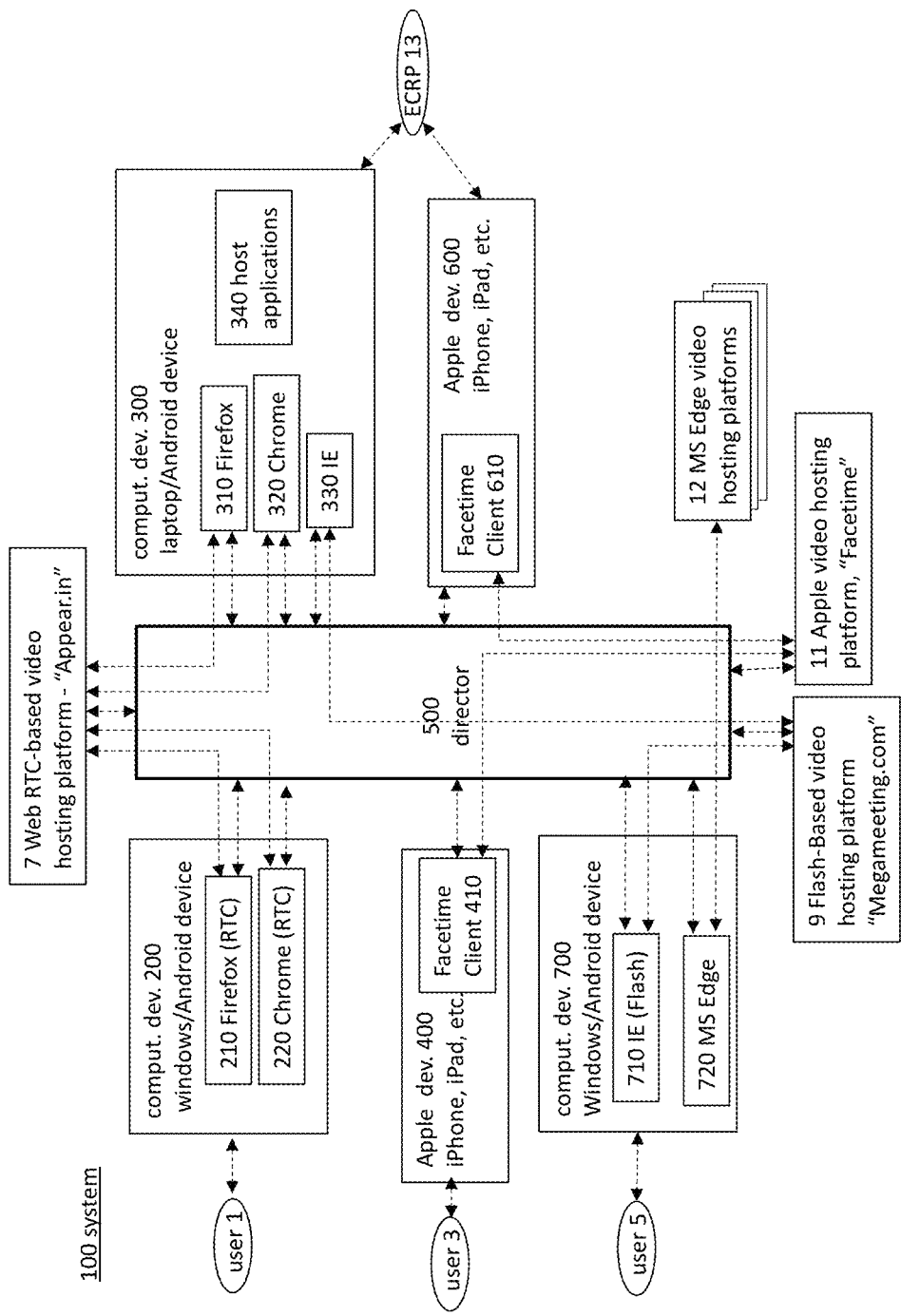
FIG. 1 is a block diagram of one embodiment of a system in accordance with the present invention.

At least some of the following exemplary embodiments provide an improved system and method suitable for requesting, automatically configuring and participating in live video conferences. Many other advantages and improvements will be discussed in more detail below, or will be appreciated by the skilled person from carrying out exemplary embodiments based on the teachings herein. The exemplary embodiments have been described particularly in relation to the insurance industry. However, it will be appreciated that the example embodiments may be applied in many other specific uses.

Theory

There are many videoconferencing services available. Some are browser-based, and others use proprietary software clients on the side of a user. It is intended that the term "user" is a general term for a person who uses the system. The user, as it is described later, may be the insured, a witness or a person who participated in the accident. It is possible for others to use the system according to the current invention.

On the insurance company's side, the Emergency Claims Response Person (ECRP) may be an adjuster, claims specialist or other employee of the insured's insurance company. The ECRP may be an insurance agent working with the insured's insurance company. The ECRP may also be a person who works with legal matters which is either employed by, or associated with, the insured's insurance company. The ECRP may also be an independent legal person such as an outside Attorney which has made previous arrangements with the insurance company to be notified of accidents.

For example, WebEx requires that a proprietary WebEx client be downloaded and configured for use. Another example is "GotoMeeting.com". This also requires a download of software and configuration to use the service.

Similarly, there are other videoconferencing services that require the user to download proprietary client software to use the service.

"Appear.in" and "Megameeting.com" are two videoconferencing services that allow a user to connect to a videoconferencing service with a browser. "Appear.in" employs an RTC format for communications between the user and the Appear.in server.

Megameeting.com employs a different format and employs Flash technology by Adobe.

The three major browsers used are Firefox, Google Chrome and Microsoft's Internet Explorer.

There are numerous browser plug-ins and add-ons that can be downloaded and installed in the browsers which will allow the browsers to use these, and other videoconferencing services. However, as indicated above, one goal of the current invention is to reduce or eliminate the requirement of downloading and installing software. Users do not want to spend time and effort downloading and installing software. If a website requires them to do so, they will simply go to another website.

Also, in the case of an Accident, the person involved may be too nervous or upset to perform otherwise simple tasks such as downloading, configuring and signing into sites or Apps.

For those who try to download and install software, they may incorrectly install it, or may configure it improperly. This may cause the site to function improperly, or not at all. The user, most probably, will go to a different website.

Browsers are now distributed with inherent capabilities and have pre-installed plug-ins. For example, Firefox is distributed with the capability of running RTC communications format with no additional plug-ins, add-ons, or extensions.

Therefore, Firefox is compatible with the communications format for Appear.in videoconferencing. However, Firefox, without modification, cannot run Flash-based videoconferencing of Megameeting.com.

Similarly, Chrome can run RTC format communications, but cannot run Flash-based videoconferencing service of Megameeting.

Internet Explorer, without modification, is capable of running the Flash-based Megameeting, but is not compatible with Appear.in.

Anyone using an iPhone, iPad or Apple laptop or Apple desktop computer would be running an entirely different set of software than any of those described above. This is because these are all based upon the Apple Operating System.

Facetime is an Apple proprietary videoconferencing service that runs on Apple mobile devices that run on iOS, and Macintosh computers that run Mac OS X (version 10.6.6 and later versions). Therefore, the company needs a device which runs iOS or Mac OS X to communicate with a potential client on an Apple device.

Therefore, the system should be capable of either automatically sensing the operating system and the type of browser that the user is running or receiving input from the user as to this information. Then, the system must determine which videoconferencing service will be able to run with the user's unmodified browser.

In addition to providing video communications between strangers with little or no setup, the current system is well suited for use after an accident. Due to its simplicity, it can quickly and easily provide a video link between a person who has gone through a traumatic event, such as an Accident, and is currently disoriented and upset.

After an Accident, certain actions are time-sensitive. Most importantly, it must be determined if anyone requires medical care. If so this should be requested immediately. Since ambulance companies only cover certain areas and if an area is covered by more than one, it is best to contact the one which can be at the accident scene first. Usually, when there is an accident, those involved in the accident do not know which ambulance company covers the location of the accident. There is the 911 emergency service; however, sometimes those involved in the accident do not feel that the accident is large enough to be considered an 'emergency' and are reluctant to contact 911. This is also the case with contacting the police, fire company and other first responders.

In an auto accident, if vehicles are blocking traffic, it is determined if a towing service is necessary. If so, an appropriate company is contacted.

The people who may have first-hand information on the Accident, witnesses, quickly leave the scent and cannot be found later if needed. It is possible that by the time the police arrive at the scene, some of those involved in the accident leave the scene and cannot be contacted later.

In an auto accident, if the vehicles are blocking traffic, they are quickly moved to allow traffic to flow. Therefore, it is up to those at the scene to describe the resting locations of the vehicles, their orientations. Sometimes these descriptions are not consistent and there is no way to prove their locations and orientations. This information may be valuable later in recreating the accident.

Implementation of First Embodiment

The current system is best used to provide immediate face-to-face meetings with little or no setup required. It is explained in this application with respect to use in the insurance industry. However, it should be known that this system, with minor modification may be implemented in various other industries.

FIG. 1 is a block diagram of one embodiment of a system in accordance with the present invention. FIG. 1 shows the system 100 for providing live video conferencing between a plurality of users, user 1, user 3, user 5 and an ECRP 13. As indicated above, the ECRP 13 may be an insurance adjuster, claims specialist, legal person associated with insurance company, or an outside Attorney. User 1 interacts through a computing device 200, which is shown here as a Windows or Android device.

Similarly, User 5 has a Windows or Android computing device.

User 3 has an iPod, iPad, iPhone, Macintosh or other iOS device, which are collectively referred to as an Apple device 400.

At least one of users 1, 3, 5 using computing device 200 would like to communicate with the ECRP 13 through the computing device 300. The system is intended to provide video conferencing between the ECRP 13 and any of the users with little or no setup or configuration on the part of the users.

There are video hosting services and/or websites which provide services that can link users with the ECRP 13 to have video conference sessions. At least a few of these services will also allow ECRP 13 to share the output of the screen of computing device 300 with at least one of the users.

Web RTC-based video hosting service 7 is one type of video conferencing service such as the website known as "Appear.in". This video hosting site performs video conferencing using RTC-based video format.

There are also video hosting services which use other communications formats. For example, video hosting service 5, shown here as "Megameeting.com" uses Adobe Flash for video conferencing.

Both the web-RTC and Flash formats require connection through a web browser. Computing device 200 has an installed browser, shown here as Mozilla Firefox 210 and/or Google Chrome 220. The current versions of both browsers have the capability of interfacing with web-RTC-based videoconference sites/service without requiring any downloads, plug-ins, or special configurations.

However, computing device 700 used by user 5 only has the Internet Explorer (IE) web browser 710 and a Microsoft Edge web browser. Even though IE 710 is compatible with web-RTC videoconferencing, it operates much better with Flash-based web services.

The Microsoft Edge browser 720 is intended to be compatible with the Microsoft video hosting platform 12.

Microsoft Edge supports web-RFC video format. Below is a list of other video formats supported by Microsoft Edge.+

| Media file to serve | Extension setting | Mime type setting |
|---|---|---|
| Video MP4 | .mp4 | video/mp4 |
| Video WebM | .webm | video/webm |
| Video HLS | .m3u8 | application/vnd.apple.mpegurl, audio/mpegurl, application/x-mpegurl, or audio/x-mpegURL |
| Video DASH | .mpd | application/dash+xml |
| Video Motion JPEG | .mjpeg | video/x-motion-jpeg |

Apple device 400 is not compatible with Adobe Flash and will not work with the Flash-based video hosting platform 9. The Apple device 400 is also not compatible with the web-RTC service video hosting platform 7.

Apple device 600 performs videoconferencing using the Apple proprietary Facetime Client 410 to communicate with the Apple video hosting platform 11, without the need for a browser.

Computing device 300 used by ECRP 13 must connect to the same video hosting platform to which the user has connected, in order to videoconference.

Therefore, if user 5 would like to videoconference with ECRP 13, they should both connect to Flash-based video hosting platform 9, since computing device 700 is only running Internet Explorer browser that works best with Flash-based video hosting format, and the Windows/Android device 700 cannot connect to the Apple video hosting platform 11 since it does not run the iOS Operating System.

Figure 3A:
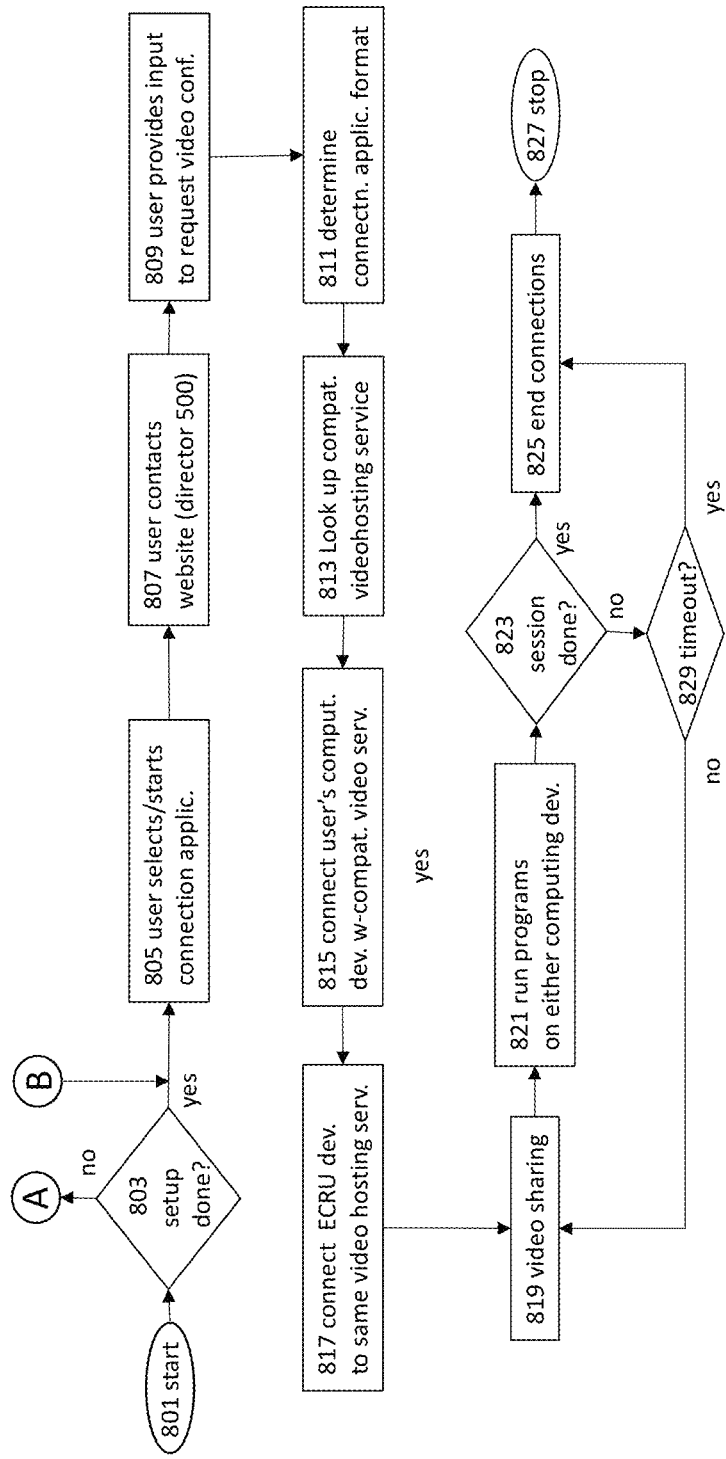
FIGS. 3A and 3B together are a simplified flowchart illustrating the major steps of a process according to one embodiment of the current invention.
Figure 3B:
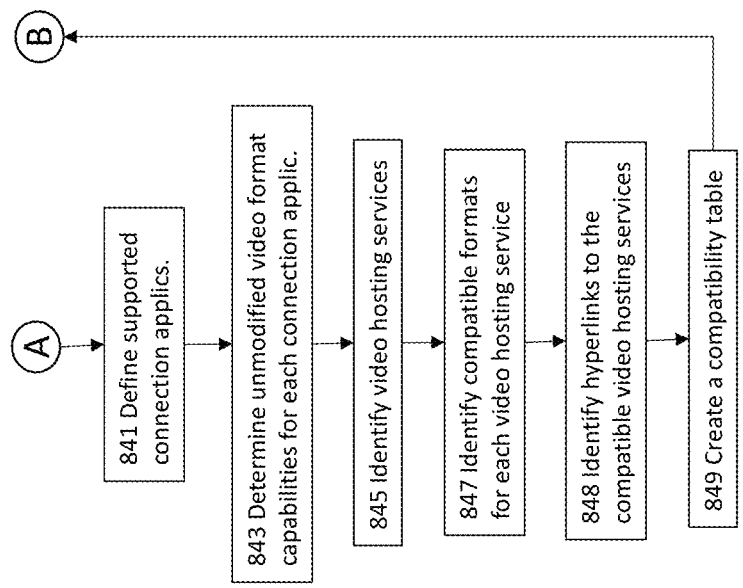

FIGS. 3A and 3B together are a simplified flowchart illustrating the major steps of a process according to the current invention. The embodiment of FIG. 1 will now be explained in connection with FIGS. 1, 3A, and 3B to indicate the structure and functioning of the system according to one embodiment of the present invention.

The process starts at step 801 in FIG. 3A. In step 803, the computing device 300 identifies if the system went through the setup process as set forth in FIG. 3B.

Assuming that setup has been completed ("yes"), processing continues at step 805.

In step 805, the user selects a browser and starts it.

In step 807, user 1 connects through the selected browser running on computing device 200, to a website linking the user's computing device 200 to a director 500, which may be a web server.

In step 809, user 1 provides input indicating that the user would like to have a video conference with the ECRP 13. The user 1 may do this by selecting a button on the website screen requesting a video conference. User 1 may also indicate which connection application they would like to use for video conferencing. This may be a browser, Facetime client or software compatible with the Facetime client.

In step 811, if a valid connection application has not been provided by user 1, or if no connection application has been provided by user 1, director 500 (FIG. 1) determines which connection application is being used. This may be done by asking the user to provide input identifying the connection application being used. Alternatively, a device inside of the director 2500 can analyze the signal provided by the connection application to determine which type it is.

Also, in step 811, the director 500 looks up the connection application in the compatibility table created during setup, to determine the format to use for videoconferencing.

In step 813, director 500 looks up compatible video hosting service platforms in the compatibility table for the connection application/operating system being used.

In the embodiment of FIG. 1, Director 500 makes a connection between the user's computing device 200 and the compatible video hosting service platform 7, 9, 11, 12 found in the compatibility table, as indicated in step 815.

In step 817, director 500 also makes a connection between the agent's computing device 300 and the same video hosting platform 7, 9, 11, 12 to which computing device 200 is connected.

In step 819, user 1 and ECRP 13 are able to freely video conference. In this embodiment, all communications are passing through director 500 in both directions.

In step 821, the ECRP 13 has the ability to run programs and share screens with user 1. ECRP 13 may then run software to calculate premiums and coverage and share the results with user 1.

In step 823, either user 1 or ECRP 13 may indicate that the session is over.

In step 825, the connections are ended, and processing stops at step 827.

In the event the session is not done in step 823 "no", in step 829 it is determined if the system has timed out. If so, "yes", step 825 is executed.

If in step 829, it is determined that there has not been a time-out, then processing continues at step 819.

Referring now back to step 803 of FIG. 3A, if it is determined that setup has not yet been completed ("no") then processing continues at step 841 of FIG. 3B.

In step 841, the connection application that the system is to support is determined. This may be browsers such as Google Chrome, Mozilla Firefox and Internet Explorer. For the Apple iOS systems, this will be Facetime or compatible software.

In step 843, it is determined which format capabilities each supported browser has. This will be the capabilities it has in its current common distribution. Some of these have built-in capabilities, or are distributed with pre-installed plug-ins, extensions or add-ons. Specifically, it is determined which video conferencing formats each can support straight 'out of the box'. This is typically how a user, and more specifically, a less sophisticated user employs their browser.

In step 847, a plurality of web hosting platforms 7, 9, 11, 12 that may potentially be used are identified and their formats noted. Those having formats which match the formats of the browsers, and in the case of an Apple device, which match the Apple video format of Facetime client, are determined.

In step 849 the web hosting platforms 7, 9, 11, 12 that have formats compatible with the supported browsers or Facetime client are entered into a compatibility table along with their format. There is also at least one entry for Apple devices using Facetime client.

Processing then continues at step 805 of FIG. 3A.

The above description is for illustrative purposes and describes user 1 connecting to the system for videoconferencing with the ECRP 13. However, the other users may also connect through the system and connect with ECRP 13, in turn.

Figure 2:
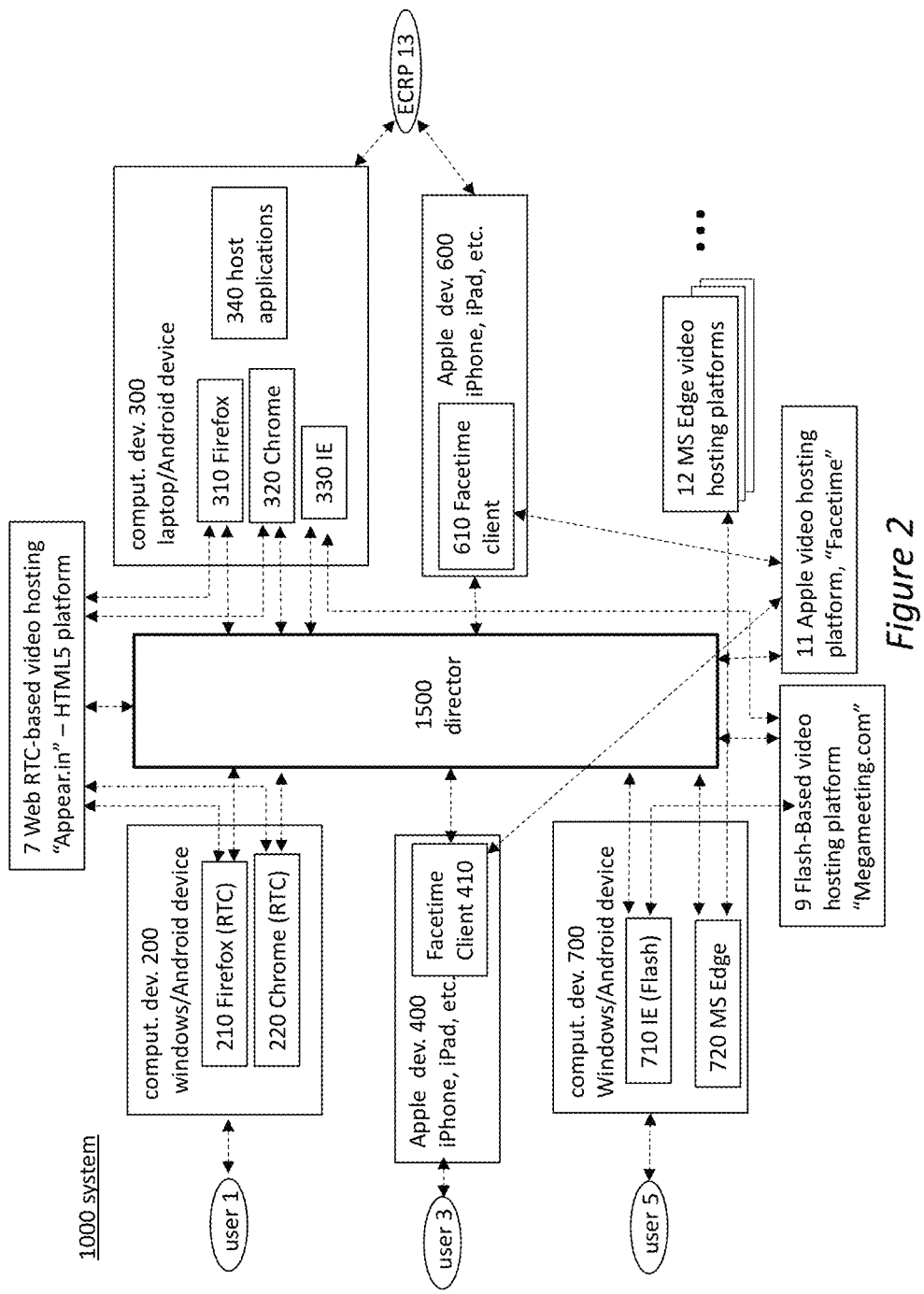
FIG. 2 is a block diagram of another embodiment of a system in accordance with the present invention.

FIG. 2 is a block diagram of another embodiment of a system in accordance with the present invention. In this embodiment, director 1500 sends a link to computing device 200, allowing computing device 200 to directly connect to video conferencing platform 3, instead of connecting through director 1500.

Also, computing devices 300, 400, 600, and 700 may receive links from director 1500 which allow them to directly connect to compatible video hosting platforms 7, 9, 11, 12.

In this embodiment, director 500, 1500 is not bogged down by continuously passing video to and from the video hosting platform for both the users and ECRPs. The director 500, 1500 now simply supplies information relating to the selected web hosting platform to computing device 200 and computing device 300 causing both to connect to, and communicate through the video hosting platform, freeing up the director 500, 1500 for other duties.

Figure 4:
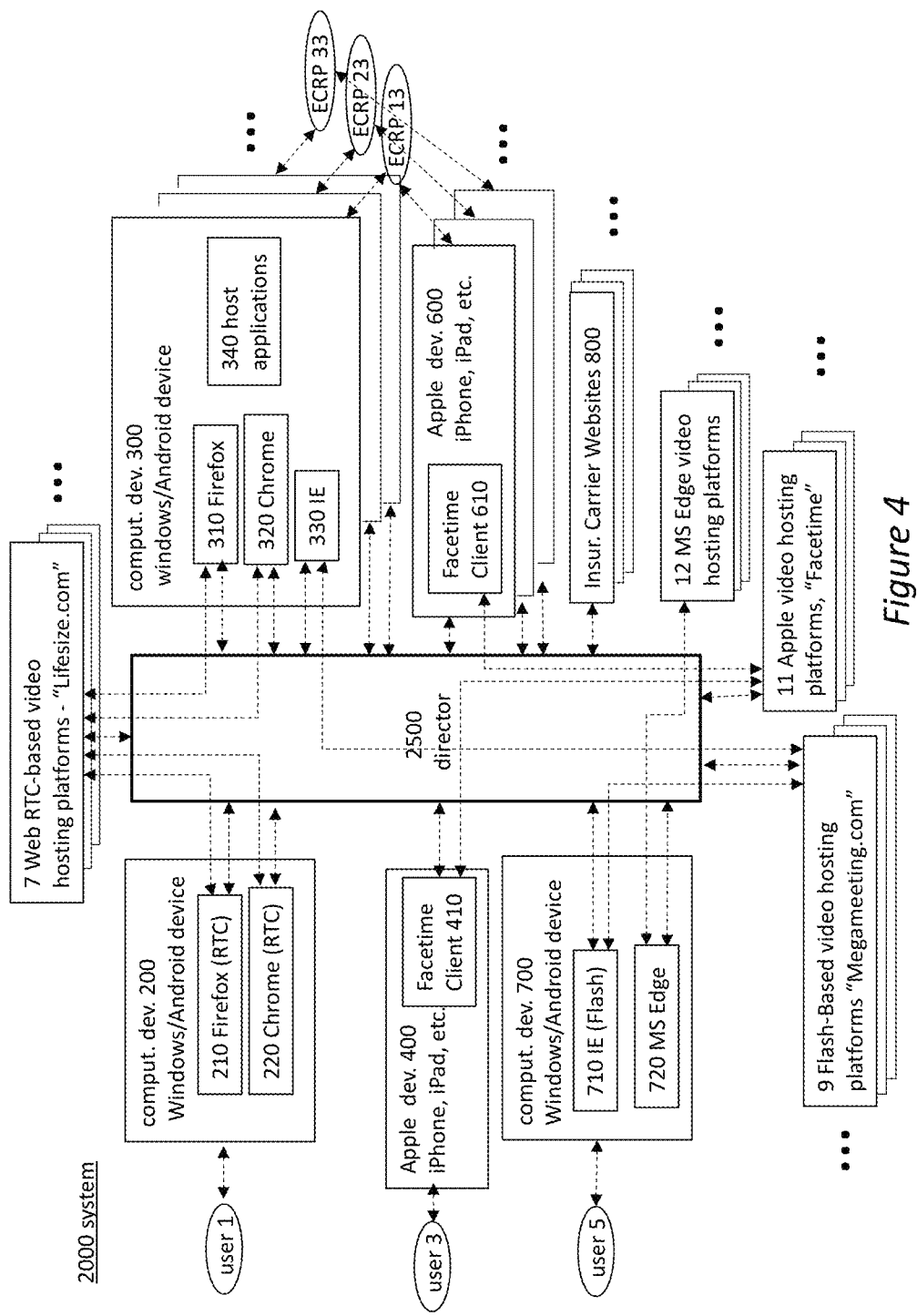
FIG. 4 is a block diagram of still another embodiment of a system in accordance with the present invention.

FIG. 4 is a block diagram of still another embodiment of a system in accordance with the present invention. In this embodiment, instead of a single ECRP 13, there are now a plurality of ECRPs 13, 23, 33, etc.

Each of these agents has a corresponding computing device similar to that of computing device 300. Each is allowed to videoconference and share screens with one or more of the users.

Director 2500 is shown in FIG. 4 receiving and routing signals to and from video hosting platforms 7, 9, 11 and 12. It is understood that FIG. 4 can be modified to provide links to the user computing devices 200, 400, 700 to allow them to directly connect to the video hosting platforms 7, 9, 11, 12, as was described above.

In still another embodiment, instead of browsers or connection application, computing devices 200, 400, 700 may have an App which is 'hardwired' to connect to the director 500, 1500, 2500. The App may include all the features described above and additionally include links to insurance carrier websites 800. In this manner, the users 1, 3, 5 can video conference with ECRPs 13, 23, 33, etc. They also can run host application 340 to show various information/graphics on the screens of the computing devices 200, 400, 700.

The App can also have an interface to link to and interact with websites of various insurance carriers, such as Travelers, Progressive, etc. This can all be done without the user having to know and type in the insurance company's URL, the insurance carrier's URL, the user's insurance policy number, etc. This will provide quick and accurate information to the user with minimal effort.

Figure 5:
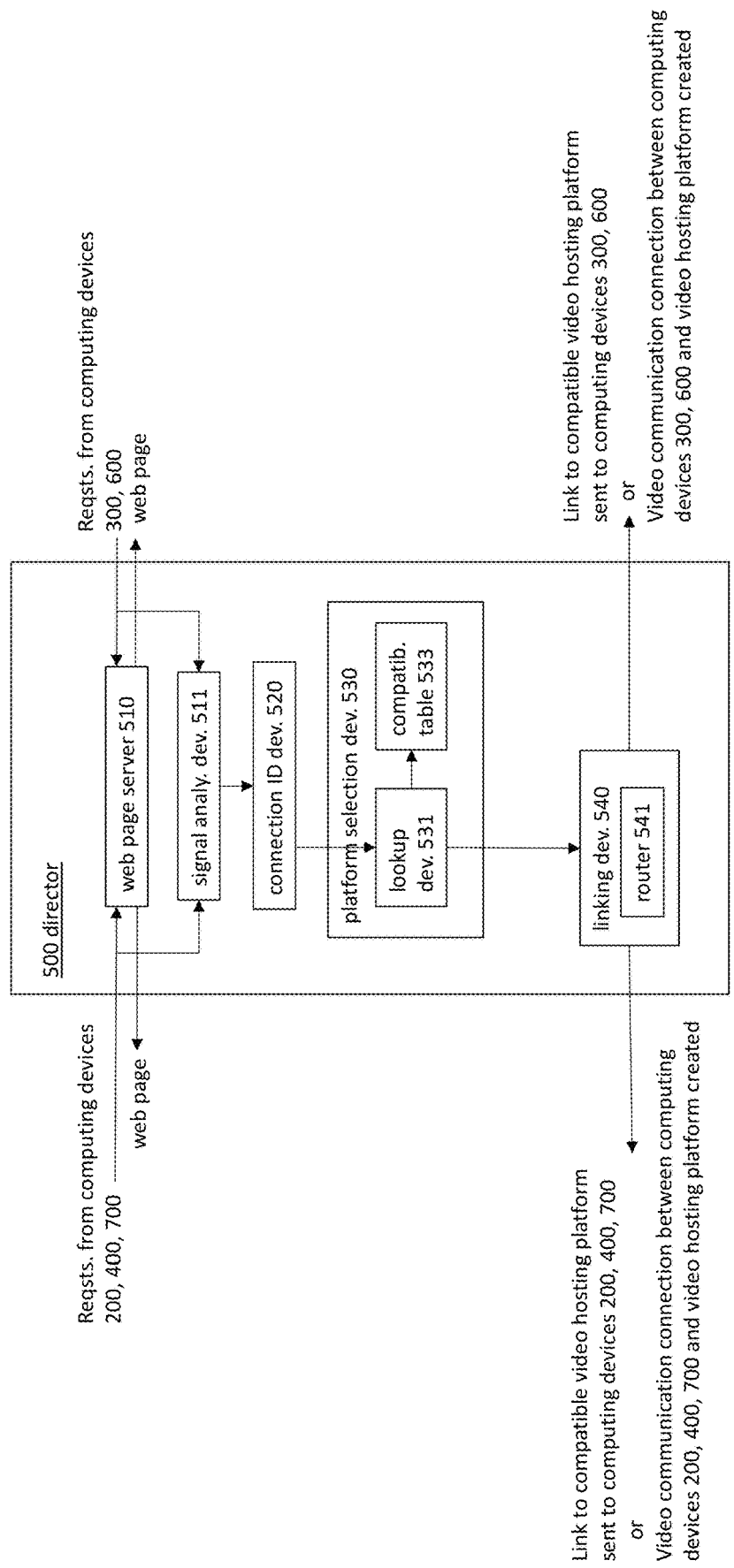
FIG. 5 is a more detailed illustration of an embodiment of a director compatible with at least one embodiment of the current invention.

FIG. 5 is a more detailed illustration of an embodiment of a director 500 compatible with the current invention. In this embodiment, requests for the agent's web pages are sent by the user's computing device 200, 400, 700 to the director 500.

Web page server 510 receives the request and 'serves' the web pages to the requesting computing device 200. User 1 selects a button requesting a videoconference with ECRP 13.

In at least one embodiment, a signal analysis device 511 also receives the request from computing device 200. It analyzes the request and determines what format of signal has been received. It then sends the signal format to a connection ID device 520 that determines which browser, or connection program is being used.

If ID device 520 determines that is associated with an Apple device 400, or other device. If it is an Apple device, then this determination is sent through lookup device 531 to linking device 540 for connection to Apple video hosting platform 11 of FIGS. 1, 2 and 4. This connection may be through the director 500, 2500 as shown in FIGS. 1 and 4, or may be a direct link between the user's computing device 400 and the Apple video hosting platform 11, as shown in FIG. 2.

Lookup device 531, knowing the browser type, then looks up compatible formats and video hosting platforms 7, 9, 11, 12 in the compatibility table 533 which employ these compatible formats, and hyperlinks to these video hosting platforms 7, 9, 11, 12. Lookup device 531 and compatibility table 533 are part of a platform selection device 530 that identifies compatible video hosting platforms.

An example of a compatibility table is shown below.

and the Apple device 600 of ECRP 13 to connect using Facetime client to Apple video hosting platform 11.

Implementation of Second Embodiment

Figure 6:
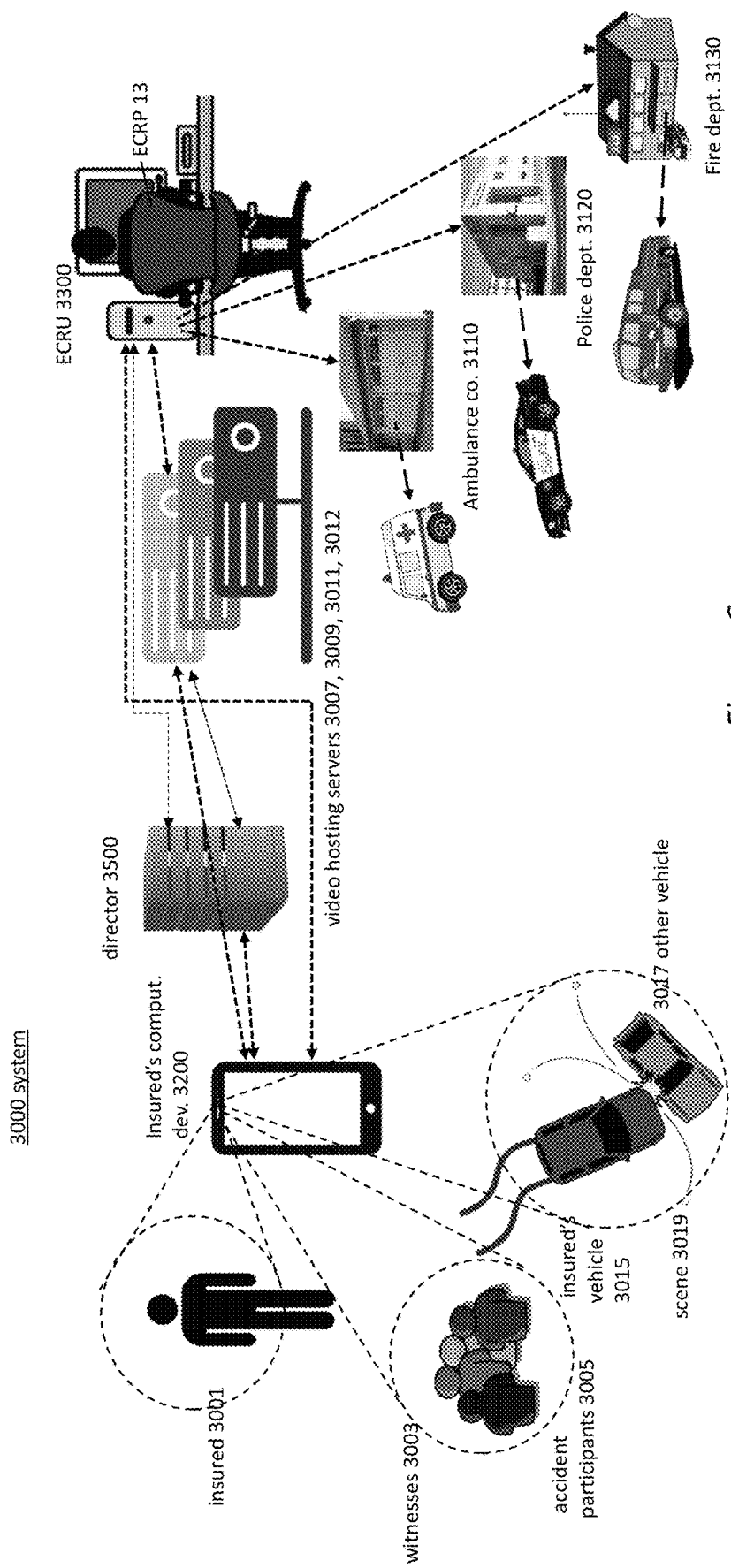
FIG. 6 is a general block diagram of another embodiment of a system in accordance with the present invention illustrating its implementation after an auto accident.

FIG. 6 is a general block diagram of another embodiment of a system in accordance with the present invention illustrating its implementation after an auto accident.

Figure 7:
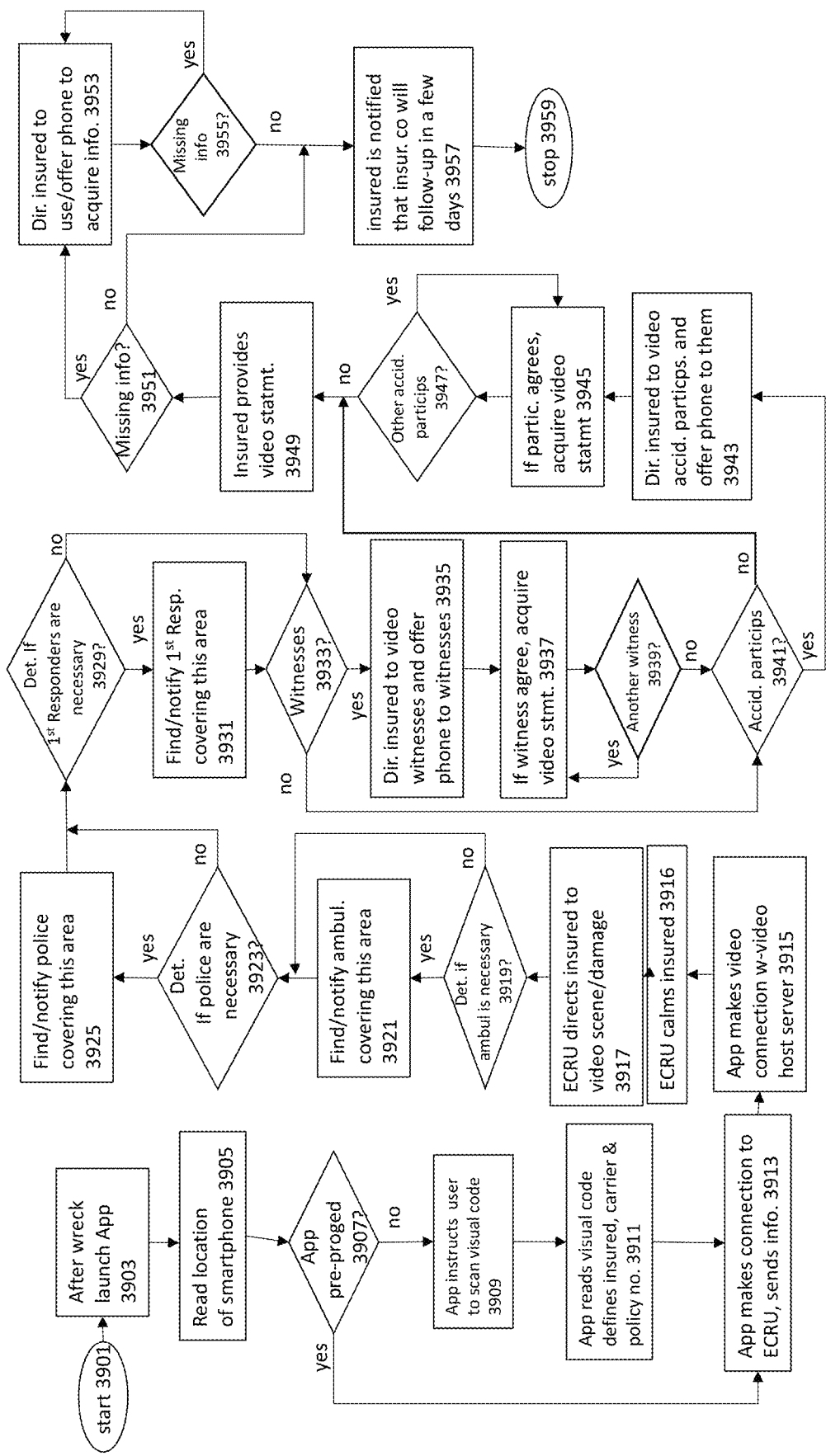
FIG. 7 is a simplified flowchart illustrating the major steps of a process according to another embodiment of the current invention.

FIG. 7 is a simplified flowchart illustrating the major steps of a process according to the current invention.

An exemplary embodiment of the system 3000 according to the current invention will be described in connection with the general system diagram of FIG. 6, the flowchart of FIG. 7 with respect to an auto accident, and the specific system diagram of FIG. 8. However, it is to be understood that even though an auto accident was chosen to be described in detail for illustrative purposes, the current invention applies equally to any Accident or situation which the injuries and/or damages are at least partially covered by insurance.

Initially, an insured 3001 in insured's vehicle 3015 is involved in an accident with another vehicle 3017 at accident scene 3019. This may be observed by one or more witnesses 3003. There also may be one or more participants 3005, in addition to the driver(s), such as passengers in the vehicles 3015, 3017 involved in the Accident.

Auto-Configuration

System 3000 may be initialized before use by at least three different methods, a) by a pre-programmed App, b) by scanning a visual code; or c) by directing a generic web browser to a compatible video server.

a. Pre-Programmed App

It may be pre-configured by the insured's agent, a member of the insured's carrier company or by the insured 3001 using instructions from the agent or carrier company, pos- Compatibility Table

| OS | Connectn. Applic. | Format | Video Conf Serv. | Company User(s) | URL |
| --- | --- | --- | --- | --- | --- |
| Windows | Mozilla Firefox | web-RTC | Appear.in | single | http://appear.in |
| Windows | Google Chrome | web-RTC | Appear.in | single | http://appear.in |
| Windows | Mozilla Firefox | web-RTC | Lifesize.com | multiple | http://lifesize.com |
| Windows | Google Chrome | web-RTC | Lifesize.com | multiple | http://lifesize.com |
| Windows | Microsoft IE | Flash-type | MegaMeeting.com | single | http://megameeting.com |
| Windows | Microsoft Edge | web-RTC | Appear.in | single | http://appear.in |
| Windows | Microsoft Edge | web-RTC | Lifesize.com | multiple | http://lifesize.com |
| Apple iOS | Facetime Client | Apple browser/ Facetime client | Facetime server | single | Apple web servers |

Linking device 540 then may send one of the links to the user's computing device 200 to make a direct link to the video hosting platform 7, 9, 11, 12.

Alternatively, there may be a return link in which the user's computing device 200 makes a connection back to the director after a videoconferencing session is completed.

Alternatively, linking device 540 may make its own connection to the video hosting platform 7, 9, 11, 12 and function to pass video communication between the video hosting platform 7, 9, 11, 12 and the user's computing device 200.

In still another embodiment, linking device 540 may employ a router 541 to the linking and/or routing.

In alternative embodiments, functions of the director may be moved to, and performed by the computing device 300 and/or Apple device 600.

When user 3 requests a video conference, the director 500, 1500, 2500 directs both the Apple device 400 of user 1 sibly on-line. This may be done by following steps on a website which allow specific information on the insured 3001 to be entered into the App 3211 (FIG. 8) on the insured's computing device 3200. The information entered may include the name of the insurance carrier, the policy number, coverage options, and other insurance policy information. It may also include the information indicating the insured's computing device 3200 hardware type (Ex. Samsung galaxy II), operating system (Ex. Android KitKat), and communication software (Ex. Firefox with version number) to be used to connect. It also may store a URL link to the compatible video hosting server (Ex. Web RTC-based video hosting service "Appear.in", an HTML5 platform). This will allow insured's computing device 3200 to make a direct link to the video hosting server requiring little or no interaction with the director 3500 and would be an alternative embodiment of the system 1000.

b. Scanning a Visual Code

The insured's computing device 3200 includes a camera 3207 and executable code in the App 3211 that causes it to extract codes in a visual image scanned by camera 3207. These visual codes may be a bar code, a QR code or other visual image which can include data. The visual code may include a URL to director 3500. Once contact is made to director 3500, information decoded from the visual image (such as that indicate above for the prestored information) is provided to director 3500 to identify the insured 3001 and possibly, the insured's computing device 3200 to be used to connect.

Director 3500 as indicated in the above referenced related patent application, then determines a compatible video hosting server (Web RTC-based video hosting service "Appear.in", an HTML5 platform) which is indicated back to the insured's computing device 3200 along with any other information required to make a video conference connection with the video conference server. The insured's computing device 3200 now has the information to make a direct connection to the video conference server. The App 3211 causes control unit 3201 to make a video conference connection with the video hosting server and acquires a session number and other login information. The App 3211 also causes control unit 3201 to send a notification to the ERU 3300 indicating the video hosting server being used, the conference number and the format being used for communications.

The use of a visual code is the preferred method of making a video connection, since it is the least difficult method and is easily implemented by a traumatized person who has just experienced a tragedy.

c. Directing a Generic Browser

The system 3000 is designed to make a video connection without the need for downloading software or apps. It also does not require configuration, but is auto-configured. It is assumed that the insured 3001 is nervous and does not have the patience to download or configure Apps at this time. Previous systems which required downloads or configuration have not been used in the past or used very little for this reason.

The method of the current invention starts at step 3901 (FIG. 7), just after the Accident. The insured 3001 initiates a program of executable instructions, an App 3211, on insured's computing device 3200 in step 3903.

This App 3211 has preprogrammed logic to begin setting up and configuring the system 3000. Once configured, system 3000 will allow a remotely-located emergency claim response person (ECRP 3013) to take control of the situation and provide specific step-by-step post-accident instructions to handle the situation after the accident. As indicated above, the insured 3001 and the accident participants 3005 have been through a traumatic experience and are nervous and disoriented. It is difficult for them to make simple decisions and answer simple questions. Therefore, certain actions are performed by system 3000 and a live ECRP 3013 is available verbally to direct the insured through a live video link.

In step 3905, the APP 3211, reads an internal GPS (3203 of FIG. 8) to determine the exact location of the insured's computing device 3200. The App 3211 asks the insured 3001 if (s)he is at the accident scene 3019. If the answer is "yes", then this is stored as the location of the accident, the accident scene 3019.

In step 3907 it is determined if the App 3211 was preprogrammed with the information of the insured 3001. If so, steps 3909 and 3911 are skipped and processing continues at step 3913.

If the App 3211 was not preprogrammed, then in step 3909, the insured 3001 is instructed to scan a visual code with camera 3207, such as a QR code on their Insurance ID card, a sticker placed on their car, or on other papers provided by an insurance agent to the insured 3001, preferably when they initially purchase their insurance policy.

In step 3911, the visual code provides information for the insured's computing device 3200 to connect to the director 3500. The visual code can also provide other information such as the policy number, the insurance carrier, etc.

In step 3913, the insured's computing device 3200 contacts the director 3500 the director 3500 which reads the format to indicate the operating system and communication program being used. Director 3500 connects the insured's computing device 3200 with an appropriate video hosting server 3007, 3009, 3011, 3012 that is compatible with the insured's computing device 3200, as discussed above with respect to FIGS. 1-5.

Either the director 3500, or alternatively, the insured's computing device 3200 notifies the ECRU 3300 that the insured 3001 is requesting an urgent video connection with the ECRP 3013, and provides information as to the video hosting server, a video session number and password and information identifying insured 3001.

In step 3915, ECRU 3300 connects to the same video hosting server and conference to set up a video session between the insured 3001 and the ECRP 3013.

The insured 3001 has just experienced an accident, and is typically nervous and disoriented. In step 3916, ECPR 3013 is directed by ECRU 3300, preferably on an input and output (I/O) device 3305 to speak directly with insured 3001 and take steps to calm down insured 3001. Some of these prompts may be the acknowledgement that the insured 3001 is upset, indicating that the ECRP 3013 will be there every step of the way to walk the insured 3001 through the process of filing an insurance claim and that the ECRP 3013 is experienced in this type of work and will make sure that there everything runs smoothly. This is one of the advantages of this system—immediate face-to-face conferencing with, and support from a trusted individual (ECRP 3013) who is can walk the insured 3001 through the steps of the post-accident process such as the filing of an insurance claim.

Typically, the insured 3001 has not been in any accidents, or the last accident was a while ago. The inured 3001 does not remember the steps that (s)he performed after the previous accident, and most likely does not know what the current process is now. Therefore, the insured 3001 will most likely want a professional who (s)he trusts direct him/her to perform the proper steps and acquire the proper information.

Figure 8:
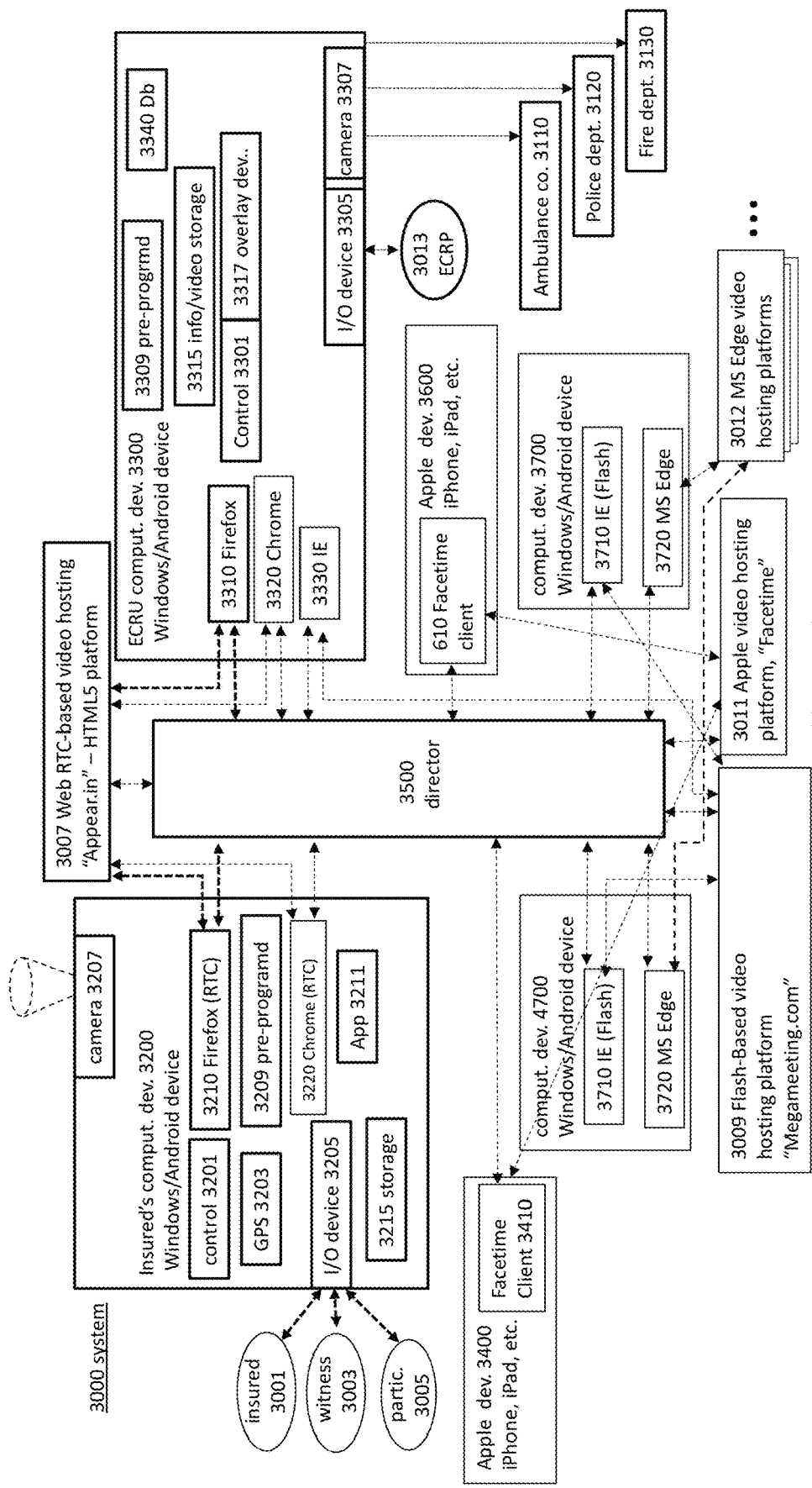
FIG. 8 is a more detailed block diagram of another embodiment of a system in accordance with the present invention illustrating its implementation after a house fire.

The ECRU 3300 has a list of actions to be performed and information to be acquired stored in the pre-programmed memory (3309 of FIG. 8). These generally include:
  a. emergency response actions, and
  b. on the scene information acquisition to settle the insurance claim.

This is one of the customer services which will set the companies using the current system apart from the others by offering a useful and meaningful personal service at the time the insured 3001 needs it most.

The ECRU 3300 can be embodied several different ways. In a first embodiment, prompts are only provided to the ECRP 3013 on an input and output (I/O) device near the ECRP 3013. I/O devices 3205, 3305 may include touchscreens, keyboards, mice, trackballs, monitors, touchpads, speakers, microphones, etc. The ECRP 3013 then communicates via video with the insured 3001.

In another embodiment, at least some of the instructions are provided to the insured's communication device 3200. These may be in the form of questions with buttons to answer the questions, arrows, icons, etc. For example, the ECRU 3300 may display to ECRP 3013 instructions to acquire video of the damage to the insured's vehicle 3015. The ECRP 3013 will speak via video to the insured 3001 asking the insured to hold the insured's computing device 3200 near the damaged portion of the insured's vehicle 3015 so that camera (3207 of FIG. 8) acquires live video feed of the vehicle. The ECRP 3013 can then use overlay device 3317 to overlay arrows on the I/O device (3205 of FIG. 8) of the insured's computing device 3200 which indicate which way the insured 3001 should move the camera (3207 of FIG. 8). These arrows may also include curved arrows indicating a change in orientation of the camera 3207 in several different dimensions.

Symbols may also be used to indicate that the insured 3001 should zoom in, zoom out, etc.

The I/O devices 3205, 3305 may allow the insured 3001 and the ECRP 3013 to circle or otherwise indicate desired structures, objects or features by use of touchscreen or similar technology.

To acquire accurate information quickly, it is best to get an overall visual indication of the accident scene. In step 3917, ECRU 3300 instructs the ECRP 3013 to speak with the insured 3001 to point the camera (3207 of FIG. 8) toward the accident scene. The ECRP 3013 may provide additional direction to the insured 3001 acquire videos in various directions. These videos may indicate emergency conditions which the insured 3001 is not aware. For example, the videos may indicate a possibly a potential fire situation is a fuel spill is shown. The videos also may give an indication of the severity of the accident and the number of vehicles involved.

a. Emergency Response Actions

In step 3919, ECRU 3300 prompts ECRP 3013 to ask the insured 3001 several questions to determine if an ambulance is necessary. Based upon responses given by the insured 3001 and/or the video feed from the scene, the ECRP 3013 decides on whether an ambulance is needed.

If the accident is minimal and no one is injured, the ECRP 3013 may decide that an ambulance is not necessary ("no"). In this case, the ECRP 3013 indicates to the ECRU 3300 that one is not necessary, and processing continues at step 3923.

If an ambulance is necessary ("yes"), then the ECRP 3013 makes a selection through the ECRU 3300 to indicate that an ambulance is necessary. In this case, control unit 3301 receives the current location of the accident determined by the GPS 3203 of insured's computing device 3200, and searches through a database 3340 of FIG. 9 of areas covered by ambulance companies to determine an appropriate ambulance company 3110 and sends a notification requesting service and providing the GPS location of the accident scene 3019.

Optionally, the insured 3001 is directed to acquire information of the identity of persons injured and to what extent he/she is injured.

Similarly, the ECRP 3013 asks the insured 3001 if the police are at the scene 3019 or have been notified. Since the current system 3000 is so efficient and is up an operable very quickly, the insured will, most likely, be at this step before anyone has determined which police department covers the accident scene 3019 and contacts them.

If the accident is minimal, the ECRP 3013 may decide that the police are not necessary ("no"). In this case, the ECRP 3013 indicates to the ECRU 3300 that it is not necessary to contact the police, and processing continues at step 3929.

If it is decided that the police are necessary ("yes"), then in step 3929 the ECRP 3013 makes a selection through the ECPU 3300 to indicate that the police are necessary. In this case, control unit 3301 again uses the current location of the accident, and searches through the database 3340 the police department having responsibility for the accident scene 3019 and sends a notification to the appropriate police department 3120 requesting service and providing the GPS location of the accident scene 3019.

Similarly, the ECRU 3300 directs the ECRP 3013 to ask the insured 3001 if other first responders (fire paramedics, volunteer first responders) are at the scene 3019 or have been notified.

If the accident is minimal, the ECRP 3013 may decide that the first responders are not necessary ("no"). In this case, the ECRP 3013 indicates to the ECRU 300 that it is not necessary to contact the police, and processing continues at step 3933.

If the fire department or other first responders are necessary ("yes"), then in step 3933 the ECRP 3013 makes a selection through the ECPU 3300 to indicate that first responders are necessary. In this case, control unit 3301 again uses the current location of the accident, and searches through the database 3340 for appropriate first responders and sends a notification to at least one first responder's office 3120 requesting service and providing the GPS location of the accident scene 3019.

a. Information Acquisition

After the appropriate emergency response personnel have been requested, information at the accident scene should be acquired before it is changed or lost. Therefore, it would be helpful to video the accident scene 3019 to acquire the positions of the vehicles, and their orientations, as indicated above.

Also, witnesses 3003 typically leave the scene 3019 quickly, and if they do not leave contact information. Later it is very difficult to find and contact them.

In step 3933, the ECRU 300 prompts the ECRP 3013 to ask the insured 3001 if there were any witnesses. The ECRP 3013 may cause the ERCU 3300 to play back videos of the scent 3019 and try to determine if there were any witnesses 3003, or participants 3005 which may be the driver of the other vehicle 3017, or its passengers. The participants 3005 may also include any passengers in the insured's vehicle 3015.

If there are no witnesses ("no"), then processing continues at step 3941.

If there are witnesses, then in step 3935, the ECRU 300 directs the ECRP 3013 to instruct the insured 3001 to approach one of the witnesses 3003 and offer the insured's computing device 3200 to the witness 3003.

If the witness 3003 accepts the insured's computing device 3200, the ECRP 3013 is directed to notify the witness 3003 that (s)he is employed by the insurance company and this video is being recorded, and requests that the witness 3003 simply indicate what (s)he saw.

If the witness 3003 agrees, the video feed of the witness 3003 is recorded.

The ECRP 3013, prompted by the ECRU 3300 interacts with the witness 3003 to acquire information.

When finished, in step 3939 it is determined if there are other witnesses 3003 which have not yet had a chance to indicate what they have seen.

When all witnesses 3003 have been asked, the process shown in steps 3941-3947 is repeated for the participant in the accident.

Finally, in step 3949, the ECRU 3300 prompts ECRP 3013 to request a video statement from insured 3001.

In step 3951 it is determined if all available information has been acquired. If so ("yes"), then processing continues at step 3957.

If not ("no"), then in step 3953, the ECRU 3300 directs ECRP 3013 to request that the insured 3001 answers questions, acquires video feed of objects, people or scenes, or offers the insured's computing device 3200 to another person to provide information or otherwise use the device.

For example, the ECRP 3013 may instruct the insured 3001 to acquire additional video of damage to the insured's vehicle 3015 and the other vehicle 3017. As indicated above, ECRP 3013 can use arrows, icons or verbal descriptions to instruct the insured 3001 when acquiring video feed.

In step 3955 it is determined that if there are other video feed required or if there are people on the scene that the ECRP 3013 would like to talk with ("yes"), then step 3953 will be repeated.

In step 3955 if it is believed that no required information that is currently available has been omitted ("no"), then the insured 3001 is notified that an Adjuster of the carrier insurance company will use the acquired information and videos and follow up with the insured 3001 within a few days.

The process stops at step 3959.

FIG. 8 is a more detailed block diagram of another embodiment of a system in accordance with the present invention. This more specifically indicates the structure and operation of one embodiment of the current invention.

There are many video hosting services available. Some are browser-based and others use proprietary software clients at the user side.

For example, "WebEx" requires that a proprietary WebEx client be downloaded and configured for use. Another example is "GotoMeeting.com". This also requires a download of software and configuration to use the service.

Similarly, there are other videoconferencing services that require the user to download proprietary client software to use the service.

"Appear.in" and "Megameeting.com" are two videoconferencing services that allow a user to connect to a videoconferencing service with a browser. "Appear.in" employs an RTC format for communications between the user and the Appear.in server.

Megameeting.com employs a different format and employs Flash technology by Adobe.

The major browsers used are Firefox, Google Chrome, Microsoft's Internet Explorer and Microsoft's Edge.

There are numerous browser plug-ins and add-ons that can be downloaded and installed in the browsers which will allow the browsers to use these, and other videoconferencing services. However, as indicated above, one goal of the current invention is to reduce or eliminate the requirement of downloading and installing software. The insured 3001 does not want to spend time and effort downloading and installing software immediately after an accident.

For those who try to download and install software, they may incorrectly install it, or may configure it improperly. This may cause the site to function improperly, or not at all. The user, most probably, will go to a different website. Therefore, another potential customer is lost.

Browsers are now distributed with inherent capabilities and have pre-installed plug-ins. For example, Firefox is distributed with the capability of running RTC communications format with no additional plug-ins, add-ons, or extensions.

Therefore, Firefox is compatible with the communications format for Appear.in videoconferencing. However, Firefox, in its current distribution, cannot run Flash-based videoconferencing of Megameeting.com.

Similarly, Chrome can run RTC format communications, but cannot run Flash-based videoconferencing service of Megameeting.

Internet Explorer, without modification, is capable of running the Flash-based Megameeting, but is not compatible with Appear.in.

Anyone using an iPhone, iPad or Apple laptop or Apple desktop computer would be running an entirely different set of software than any of those described above. This is because these are all based upon the Apple Operating System (iOS).

Facetime is an Apple proprietary videoconferencing service that runs on Apple mobile devices that run on iOS, and Macintosh computers that run Mac OS X (version 10.6.6 and later versions). Therefore, the company needs a device which runs iOS or Mac OS X to communicate with a potential client on an Apple device.

The current system 3000 employs an App 3211 which is preprogrammed by the Agent when visiting the Agent's office, or is preprogrammed by the insured 3001 following instructions provided by the insured's Agent.

In a second embodiment, as described above, a visual code, such as a QR code is provided to the insured 3001. When this is scanned, it loads the information specific to the insured 3001 having information identifying the insured's identity and having a URL that connects the insured's computing device 3200 to the director 3500.

In the case where the App 3211 is not preprogrammed and there is no visual code to scan, the App 3211 may use a general-purpose web browser, such as Firefox 3210 by Mozilla, Google Chrome 3220, Internet Explorer 3710 (IE) by Microsoft, Microsoft Edge 3720. Some of these are also available for the Apple iOS operating system.

FIG. 8 shows a specific implementation of the system 3000. Control unit 3201 starts up and begins executing the instruction of App 3211. In this embodiment, App 3211 employs Firefox 3210 as the communication program to make a connection to a video hosting server.

Since the App 3211 was not preprogrammed and preprogrammed memory 3209 was not previously initialized with the information required to make a connection and no visual code is available to scan, configuration must be done by the director 3500.

The director 3500 is capable of either automatically sensing the operating system and the type of browser that the insured 3001 is running. Then, the system then determines that the insured's computing device 3200 will communicate in an RTC format. Therefore, it then decides that it would be best to connect to the "Appear.in" web hosting server 3007 which is an HTML5 platform.

Director 3500 then notifies ECRU computing device 3300 to employ an RTC format communication program which may be either the Firefox 3310 or Chrome 3320 browsers and indicates to connect to the "Appear.in" web hosting server 3007. The director 3500 also provides the video session number and any login information that was provided by "Appear.in" web hosting server 3007 when insured's computing device 3200 set up the conference.

Therefore, the insured's computing device 3200 can be used in its 'native form' without the need for downloads or configuration by the insured 3001 to make a video connection with ECRP 3013 at a remote location.

Figure 9:
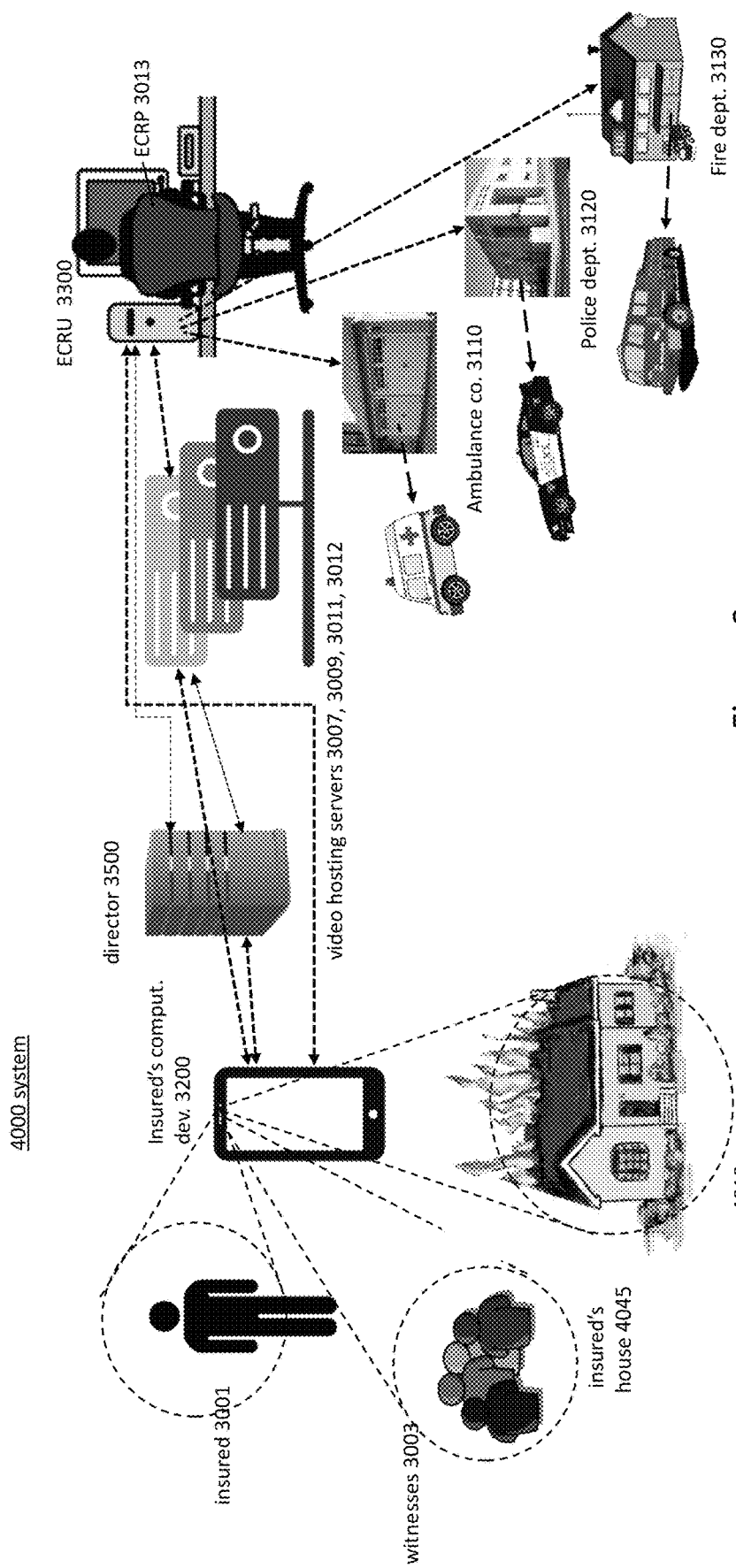
FIG. 9 is a more detailed block diagram of another embodiment of a system in accordance with the present invention illustrating its implementation after a house fire.

FIG. 9 illustrates its implementation of system 4000 after a house fire 4045. It is to be understood that the embodiment of FIG. 9 will be described in conjunction with FIGS. 6-8. Insured 3001 starts a pre-stored App that makes contact with the director 3500. As described above, the App 3211 may have been preconfigured with information identifying the insured 3001, the video hosting server to connect to and information indicating the Carrier and coverage.

In an alternative embodiment, the App has not been preconfigured, and the insured 3001 is instructed to scan a visual code on an insurance card, a sticker placed on the insured's vehicle, a refrigerator magnet provided by the insurance Carrier or Agent, or other object provided by the Carrier or Agent. The camera 3207 and executable code in the App will cause the insured's computing device 3200 to decode information embedded in the visual code and use this to identify the insured 3001 and his/her Carrier and policy information.

The director 3500 directs the insured's computing device 3200 to link to a compatible video hosting server 3007. Director 3500 also provides information to ECRU 3300 causing it to also connect to the compatible video server 3007 to make an interactive video link between the insured 3001 and ECRP 3013, as discussed above.

A camera 3307 in ECRU 3300 acquires a video feed of the ECRP 3013. The I/O device 3305 includes a microphone for acquiring audio from the ECRP 3013. The audio and video are sent via the video link to the insured's computing device 3200. These allows the ECRP 3013 to speak directly with, calm down and instruct insured 3001.

Similarly, the images from camera 3207 and audio acquired by a microphone in the I/O device 3205 of the insured's computing device 3200 are also sent over the video link to the ECRU 3300/ECRP 3013.

From this point forward, ECRP 3013, in combination with the ERCU 3300 controls the post-accident process, and information and video collection required to make an insurance claim for reimbursement to the Carrier.

ERCP 3013/ERCU 3300 requests the insured 3001 to video the house 4045, fire damage, and the accident scene 4019. As indicated above, the ECRP 3013/ECRU 3300 can activate overlay device (3317 of FIG. 8) to overlay arrows and/or symbols on the I/O device (3205 of FIG. 8) indicating to the insured which way to move the insured's computing device 3200 to acquire a desired video feed.

ERCP 3013/ERCU 3300 also instruct the insured to approach witnesses 3003 and request a statement from them while handing them the insured's computing device 3200.

If the witness 3003 is willing, he/she is notified that they are being recorded and asked to provide a description of what they saw.

After all the available information is acquired, the insured 3001 is notified by the ECRP 3013/ECRU 3300 that they will be hearing from the Carrier within a few days to settle the insurance claim.

All the acquired information is provided to the ECRU 3300 to be used by the ECRP 3013 to file an insurance claim for reimbursement. Since most of the information has been acquired, the Adjuster has very little to do to complete the claim evaluation which should greatly accelerate the insurance claim process.

The current system 3000 quickly and easily acquires information required to file an insurance claim. The information is first-hand and is much more accurate compared with prior art method of processing insurance claims. This significantly reduces the costs and time for settling insurance claims which will result in much faster reimbursements of the insured 3001, and a substantial cost savings for the Carrier.

In the disclosure above, the Emergency Claims processing Person (ECRP) 13 may be an insurance agent, and insurance company employee that may be an adjuster, or claims analyst, and/or a legal person either employed by the insurance company or not. As embodied in FIG. 4, the system 2000 may be able to link the user with one or more ECRPs 13, 23, 33. One ECRP 13 may be an insurance adjuster, the second may be a legal person which may or may not be from the insurance company. Outside Attorneys may be chosen to participate by some agreement with the Insurance company or insurance agents. Each of these Outside Attorneys would be provided a smart phone having a pre-installed App. Each will be assigned a visual symbol. When the insured is purchasing the policy, they would choose one or more Outside Attorneys to potentially consult with during an Accident. The corresponding visual symbols will be provided to the insured and preferably attached to their vehicles. At the time of an accident, the insured scans the visual image of the insurance company employee and, if they want legal advice or would like to send the information to an Outside Attorney, they would also scan the Outside Attorney's visual symbol. This would connect the insured to both the insurance company employee and the Outside Attorney at the same time. Both images will be seen on the phone.

Alternatively, the insured can contact each in sequence. There would be a choice to provide the video files acquired during the session with the insurance adjuster to be sent to the Outside Attorney. Since the information required by the Outside Attorney is similar to that acquired by the insurance adjuster, most of the files will be done. The system which notifies and directs the insurance adjuster of what to acquire will be generally the same at that for the Outside Attorney, with some differences.

Therefore, there will be contemporaneous video notes taken of the scene and comments acquired from people with actual knowledge of the Accident while it is fresh in their minds. Also, there will be a video record of the Accident scent before anything has been altered, moved or removed.

Although a few examples have been shown and described, it will be appreciated by those skilled in the art that various changes and modifications might be made without departing from the scope of the invention, as defined in the appended claims.

What is claimed is:

1. A method of having a remote claim response person (ERCP) take control of, and direct the actions of an insured in an accident situation, comprising the steps of:
   a. connecting an insured's computing device to a video hosting server, wherein the connecting step further comprises:
      i. using the insured's computing device and an existing web connection application to connect to a website of a remote claim response person (ERCP);
      ii. indicating, by the insured via the insured's computing device, that the insured would like to videoconference with the ERCP;
      iii. coupling a director to the insured's computing device;
      iv. employing the director to determine at least one compatible video hosting server by:
         1. automatically determining a format of an existing connection application that is currently on the insured's computing device and is being used by the insured's computing device,
2. automatically determining the current video format capabilities of the insured's existing connection application,
3. looking up a compatible video hosting server in a compatibility table,
v. coupling a computing device of the ERCP to at least one of the video hosting server to which the insured's computing device is coupled and the director;
vi. employing the director to pass video communications between the insured's computing device and the coupled video hosting server; and
vii. employing the director to pass video communications between the ERCP's computing device and the coupled video hosting server;
b. creating a video communication link between the ERCP to the insured's computing device through an Emergency claim Response Unit (ECRU) and the video hosting server;
c. providing prompts to the ECRP with the ECRU directing the ECRP through the steps of:
i. speaking with the insured to calm and instruct the insured the insured through an insurance claim filing process;
ii. finding, contacting and requesting assistance from necessary ambulances, police, fire departments, and emergency response units;
iii. directing the insured to acquire names and physical condition of persons injured;
iv. directing the insured to acquire video feed of the accident scene, the vehicles involved in an accident, and damage to the vehicles; and
v. directing the insured to find and provide the insured's computing device to witnesses, and participants in the accident to acquire their video statements.

2. The method of claim 1 wherein the user's computing device is a smartphone.

3. The method of claim 1 wherein the step of creating a video communication link comprises the step of:
executing an App in the insured's computing device that contacts the director.

4. The method of claim 1 wherein the accident situation is one of an auto accident, a building fire, an animal attack, a slip and fall injury.

5. A system which enables an Emergency claims Response Person (ECRP) to assist an insured immediately following an accident at an accident scene in which the insured participated comprising:
a. an insured user's computing device comprising:
i. a unique visual code provided to the insured which includes embedded information about the insured and the insured's insurance policy;
ii. a camera adapted to scan the unique visual code and acquire the embedded information, the camera also is adapted to acquire video feeds from the accident scene and participants at the accident scene;
iii. an input and output device (I/O) having a microphone adapted to acquire audible sounds from the accident scene;
iv. a remote video hosting service capable of providing live video to entities communicating with it;
v. at least one communication program adapted to provide the audio sounds and video feeds from the accident situation to the remote video hosting server;
vi. a positioning device which can determine a location of the insured user's computing device; and
vii. a control unit adapted to run a predetermined application (App) when it receives the information from the scanned visual code which contacts the remote video hosting server, and requests that a video conference immediately be set up in order to remotely assist the insured in acquiring audio and video information which may be helpful in filing an accident insurance claim;
b. an Emergency claim Response Unit (ECRU) computing device comprising:
i. a camera adapted to acquire video feeds of the ECRU;
ii. an input and output device (I/O) having a microphone adapted to acquire audible sounds of the ECRU,
iii. at least one communication program adapted to connect to the remote video hosting server and provide the audio sounds and video feeds of the ECRU to the remote video hosting server;
iv. a pre-programmed device having instructions for a post-accident process for assisting the insured in filing the accident insurance claim and directing the insured to acquire audio and video information of those who have experienced the accident; and
v. a control device, adapted to execute the instructions for the post-accident process and prompt the ECRP to instruct the insured through the process for filing the accident insurance claim; and
c. a director adapted to:
i. receive the request from the insured user's computing device that the video conference immediately be set up with the computing device of the emergency claim response unit (ECRU) and facilitate a connection with the remote video hosting server which is compatible with the communication program of the insured user's computing device;
ii. automatically determine a format of an existing connection application that is currently on the insured's computing device and is being used by the insured's computing device,
iii. automatically determine the current video format capabilities of the insured's existing connection application that do not require downloads or configuration,
iv. look up a compatible remote video hosting server in a compatibility table,
v. couple the computing device of the ECRU to at least one of the remote video hosting server to which the insured's computing device is coupled and the director;
vi. employ the director to pass video communications between the insured's computing device and the coupled remote video hosting server; and
vii. employ the director to pass video communications between the ECRU's computing device and the coupled remote video hosting server; and
viii. responsive to determining that the remote video hosting server is compatible with the insured user's computing device, facilitate the connection of the ECRU to the remote server that the insured user's computing device is connected to, and use the communication program which is compatible to the remote video hosting server that the insured user's computing device is connected to thereby allowing the ECRP to create a video link and assist the insured user through the process for filing the accident insurance claim.

6. The system of claim 5, wherein at least one of the I/O device of the ECRU and I/O device of the insured user's computing device displays a post-accident instruction for filing the accident insurance claim.

7. The system of claim 6, wherein the ECRU sends video feeds and audio sounds of the ECRU verbally directing the insured through at least one of a post-accident instruction for filing the accident insurance claim.

8. The system of claim 7, wherein at least one of the post-accident instructions includes directing the insured to acquire video of at least one object, scene or person.

9. The system of claim 7, further comprising:
an overlay device which generates overlays which are displayed on the insured user's I/O device indicating actions for the insured user to execute.

10. The system of claim 9, wherein the overlay device generates visible overlays that are arrows showing which direction the insured user should move the camera of the insured user's computing device.

11. The system of claim 5, further comprising:
a. a pre-programmed storage device which includes executable code for extracting information from a visual code; and
b. a control device which executes the executable code causing the control device to extract information from the visual code when the camera scans the visual code.

12. The system of claim 11, wherein the visual code is one of a bar code or a QR code.

13. The system of claim 5 wherein preprogrammed device has prestored instructions that comprise at least one of:
a. an instruction to acquire video feeds of the accident scene;
b. an instruction to acquire video feeds of injuries of at least one person injured in the accident; and
c. an instruction to acquire video feeds of damage to property.

14. The system of claim 11, wherein the preprogrammed device includes instructions for a post-accident process for filing the accident insurance claim of one of an auto accident, a building fire, an animal attack, a slip and fall injury.

15. A process for enabling a remotely-located ECRP at an ECRU to take control of an accident situation and direct an insured at the accident site for filing an insurance claim as part of the post-accident process, comprising the steps of:
a. automatically configuring a video link between the ECRU and the insured's computing device further comprising the steps of:
i. using the insured's computing device and an existing web connection application to connect to a website of a remote claim response person (ERCP);
ii. indicating by the insured via the insured's computing device that the insured would like to videoconference with the ERCP;
iii. coupling a director to the insured's computing device;
iv. employing the director to determine at least one compatible remote video hosting server by:
1. automatically determining a format of an existing connection application that is currently on the insured's computing device and is being used by the insured's computing device,
2. automatically determining the current video format capabilities of the insured's existing connection application,
3. looking up a compatible remote video hosting server in a compatibility table,
v. coupling a computing device of the ERCP to at least one of the remote video hosting server to which the insured's computing device is coupled and the director;
vi. employing the director to pass video communications between the insured's computing device and the coupled remote video hosting server;
vii. employing the director to pass video communications between the ERCP's computing device and the coupled remote video hosting server; and
viii. video conferencing the user's computing device with the agent's computing device in real-time without requiring the user to set up an account;
b. displaying prestored instructions from a post-accident process to prompt the ECRP to instruct the insured regarding the filing of an insurance claim;
c. acquiring video/audio of the ECRP instructing the insured through the post-accident process and sending the video/audio via a video link to the insured at the insured's computing device.

16. The process of claim 15, wherein at least one of the steps of the post-accident process requires the insured to acquire videos of at least one of injuries, damage to property, damage to structures at the accident scene.

17. The process of claim 15, wherein at least one of the steps of the post-accident process requires the insured to explain what the insured saw and experienced during and immediately after the accident.

18. The process of claim 15, wherein at least one of the steps of the post-accident process comprises the step of:
directing the insured to approach a witness at the accident scene and request that the witness explain what the witness saw and experienced during and immediately after the accident.

19. The process of claim 15, wherein the user's computing device is a smartphone.

20. The process of claim 15, wherein the accident situation is one of an auto accident, a building fire, an animal attack, a slip and fall injury.

* * * * *